United States Patent
Sandor et al.

(10) Patent No.: US 11,346,236 B2
(45) Date of Patent: May 31, 2022

(54) GUIDE VANE AND TURBINE ASSEMBLY PROVIDED WITH SAME

(71) Applicant: Vitesco Technologies GMBH, Hannover (DE)

(72) Inventors: Ivo Sandor, Regensburg (DE); Sebastian Wittwer, Erfurt (DE); Ralf Böning, Reiffelbach (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 17/147,220

(22) Filed: Jan. 12, 2021

(65) Prior Publication Data

US 2021/0131297 A1 May 6, 2021

Related U.S. Application Data

(63) Continuation of application No. PCT/EP2019/068503, filed on Jul. 10, 2019.

(30) Foreign Application Priority Data

Jul. 12, 2018 (DE) ............ 10 2018 211 673.3

(51) Int. Cl.
*F01D 9/04* (2006.01)
*F02B 37/00* (2006.01)
*F04D 29/52* (2006.01)

(52) U.S. Cl.
CPC ............ *F01D 9/041* (2013.01); *F02B 37/00* (2013.01); *F04D 29/522* (2013.01); *F05D 2220/40* (2013.01); *F05D 2240/12* (2013.01)

(58) Field of Classification Search
CPC ........ F01D 9/041; F01D 17/165; F01D 5/145; F01D 5/141; F02B 37/00; F04D 29/522;
(Continued)

(56) References Cited

U.S. PATENT DOCUMENTS

| 4,242,040 A | * | 12/1980 | Swearingen | .......... F01D 17/165 |
| | | | | 415/113 |
| 4,770,603 A | * | 9/1988 | Engels | .................. F01D 17/167 |
| | | | | 415/147 |

(Continued)

FOREIGN PATENT DOCUMENTS

| DE | 102009012132 A1 | 9/2010 |
| DE | 112014003165 | 3/2016 |

(Continued)

OTHER PUBLICATIONS

International Search Report and Written Opinion dated Jan. 3, 2020 from corresponding International Patent Application No. PCT/EP2019/068503.

(Continued)

*Primary Examiner* — J. Todd Newton, Esq.

(57) ABSTRACT

A guide vane for a variable turbine geometry and a turbine assembly provided with same are described. The guide vane has an outer face that is at least partly concave in design. The inner face opposite the outer face may also be at least partly concave in design. This gives the guide vane a good functional capability when arranged in a vane ring of a turbine, since an overflow through the gap between the guide vane and the neighboring walls is reduced.

17 Claims, 2 Drawing Sheets

(58) Field of Classification Search
CPC ............ F05D 2220/40; F05D 2240/12; F05D 2250/20; F05D 2250/712; F02C 6/12

See application file for complete search history.

(56) References Cited

U.S. PATENT DOCUMENTS

| | | | | |
|---|---|---|---|---|
| 5,299,909 | A * | 4/1994 | Wulf | F01D 9/048 |
| | | | | 415/186 |
| 6,491,493 | B1 * | 12/2002 | Watanabe | F01D 5/145 |
| | | | | 415/191 |
| 6,948,907 | B2 * | 9/2005 | Vogiatzis | F01D 17/165 |
| | | | | 415/160 |
| 7,255,530 | B2 * | 8/2007 | Vogiatzis | F01D 5/141 |
| | | | | 415/159 |
| 8,016,551 | B2 * | 9/2011 | Lin | F01D 9/045 |
| | | | | 415/163 |
| 8,172,508 | B2 * | 5/2012 | Mohamed | F01D 5/141 |
| | | | | 415/115 |
| 8,500,395 | B2 * | 8/2013 | Roby | F01D 17/165 |
| | | | | 415/164 |
| 8,834,104 | B2 * | 9/2014 | Mohamed | F01D 17/165 |
| | | | | 415/164 |
| 9,057,280 | B2 * | 6/2015 | Morand | F02C 6/12 |
| 9,528,386 | B2 * | 12/2016 | Morita | F02C 6/12 |
| 9,890,700 | B2 * | 2/2018 | Sun | F02B 39/00 |
| 10,072,513 | B2 * | 9/2018 | Osako | F01D 9/02 |
| 10,392,961 | B2 * | 8/2019 | Hu | F01D 17/165 |
| 10,808,569 | B2 * | 10/2020 | Boening | F01D 5/048 |
| 10,927,702 | B1 * | 2/2021 | Park | F01D 17/165 |
| 11,047,256 | B2 * | 6/2021 | Motoda | F02B 37/24 |
| 11,092,068 | B2 * | 8/2021 | Yokoyama | F02C 6/12 |
| 2002/0094284 | A1 * | 7/2002 | Arnold | F01D 5/141 |
| | | | | 417/407 |
| 2003/0079474 | A1 * | 5/2003 | Finger | F02C 6/12 |
| | | | | 60/602 |
| 2004/0223840 | A1 * | 11/2004 | Vogiatzis | F01D 17/165 |
| | | | | 415/1 |
| 2010/0098529 | A1 * | 4/2010 | Roby | F01D 17/165 |
| | | | | 415/160 |

FOREIGN PATENT DOCUMENTS

| | | |
|---|---|---|
| EP | 0798447 A2 | 10/1997 |
| EP | 3080399 A1 | 10/2016 |
| JP | 5866802 B2 | 1/2000 |
| JP | 2000018004 A | 1/2000 |
| WO | 2008101105 A2 | 8/2008 |
| WO | 2013080795 A1 | 6/2013 |
| WO | 2013106503 A1 | 7/2013 |
| WO | 2017221159 A1 | 12/2017 |

OTHER PUBLICATIONS

German Search Report dated Apr. 12, 2019 for corresponding German Patent Application No. 10 2018 211 673.3.

* cited by examiner

GUIDE VANE AND TURBINE ASSEMBLY PROVIDED WITH SAME

CROSS-REFERENCE TO RELATED APPLICATIONS

This application claims the benefit of PCT Application PCT/EP2019/068503, filed Jul. 10, 2019, which claims priority to German Application DE 10 2018 211 673.3, filed Jul. 12, 2018. The disclosures of the above applications are incorporated herein by reference.

TECHNICAL FIELD

The present disclosure relates to a guide vane for a variable turbine geometry with rotatably mounted guide vanes which have an outer face, an inner face, an end face on the bearing housing side, an end face on the turbine casing side, a leading edge and a trailing edge. The guide vane has a cross-section which changes along a longitudinal axis.

BACKGROUND

Guide vanes are used in turbines with variable geometry having a turbine wheel which includes guide vanes and is mounted rotatably in a casing. Around the turbine wheel, guide vanes are provided in an annular arrangement and extend over an inlet passage. These guide vanes are rotatably mounted so that the flow angle at the impeller inlet can be adjusted by twisting the guide vanes.

The guide vanes described above have an outer face, an inner face and two end faces, wherein the latter are arranged between neighboring walls which are a wall facing a bearing housing and a wall facing a turbine casing. In variable geometry turbines with rotatably mounted guide vanes, a structural gap is provided between the guide vanes and the neighboring walls. The overflow through this gap carries high losses and reduces the turbine efficiency, in particular in closed guide vane positions.

SUMMARY

The present disclosure provides a guide vane of the type described above, which is distinguished by particularly good function capability. The a guide vane includes an outer face, an inner face, an end face on the bearing housing side, an end face on the turbine casing side, a leading edge and a trailing edge. The guide vane has a cross-section which changes along a longitudinal axis. The outer face is at least partially concave in design, wherein the ratio $\gamma_1+\gamma_2>0°$ applies. $\gamma_1$ is an angle enclosed between the outer face at the transition to the end face on the bearing housing side and a straight connection with s=constant between the transition of the end face on the bearing housing side and the outer face and the transition of the end face on the turbine casing side and the outer face. Additionally, $\gamma_2$ is an angle enclosed between the outer face at the transition to the end face on the turbine casing side and a straight connection with s=constant between the transition of the end face on the bearing housing side and the outer face and the transition of the end face on the turbine casing side and the outer face. Furthermore, s is the measurement point for $\gamma_1$ and $\gamma_2$ at the same relative position on the respective profile chords $s_1$ and $s_2$ of the end faces on the bearing housing side and on the turbine casing side with a profile chord length with the dimensionless unit length of 1.

Implementations of the disclosure may include one or more of the following optional features. In some implementations, the outside of the guide vane is at least partially concave in design. This is achieved if the sum of the angles is $\gamma_1+\gamma_2>0°$. With such a design of the guide vanes, the overflow through the gap between the respective guide vane and neighboring walls (of the turbine casing and bearing housing) is reduced.

In the closed state of the vane ring, therefore the overflow through the gap from the outside to the inside is reduced.

Furthermore, with such variable turbine geometries with rotatably mounted guide vanes, the operating range (throughput spread) is dependent on the possible guide vane angle adjustment range. With the guide vane design according to the disclosure, the operating range may be increased for the same guide vane angle adjustment range.

In some examples, the outer face and inner face are configured in the manner described above. The concave inner face in any case reduces an overflow through the gap from the inside to the outside in open state, and furthermore allows an increase in cross-section at maximum vane opening angle and hence a wider throughput spread.

In some examples, $\gamma_1$ and $\gamma_2$ have different values. This gives a different extent of curvature of the outer face in the region of the end faces on the bearing housing side and on the turbine casing side.

The disclosure provides a three-dimensional curvature of the outer face.

Furthermore, in some examples, the disclosure provides that the length and/or orientation of the profile chords of the end faces on the bearing housing side and turbine casing side are different.

In some implementations, the inner face of the guide vane is at least partially concave in design, where the ratio $\gamma_1+\gamma_2>0°$ applies. In this case, the inner face is configured similarly to the outer face, wherein $\gamma_1$, $\gamma_2$, s, $s_1$ and $s_2$ have the same meaning as explained above only in relation to the inner face, but may have different values.

In some implementations, the maximum sum angle $\gamma_1+\gamma_2$ lies in the range $30°<\gamma_1+\gamma_2<135°$, where this may apply to both the outer face and the inner face.

The leading and trailing edges may run rectilinearly, so that in a closed angular position, the resulting gap between two adjacent guide vanes may be closed. Here, the leading and trailing edges need not necessarily be arranged parallel to each other.

The disclosure also relates to a turbine assembly with variable turbine geometry having a plurality of guide vanes arranged in a ring around the turbine wheel between a bearing housing and a turbine casing. According to the disclosure, the guide vanes are configured in the manner described above. Such a turbine assembly may be part of an exhaust gas turbocharger.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
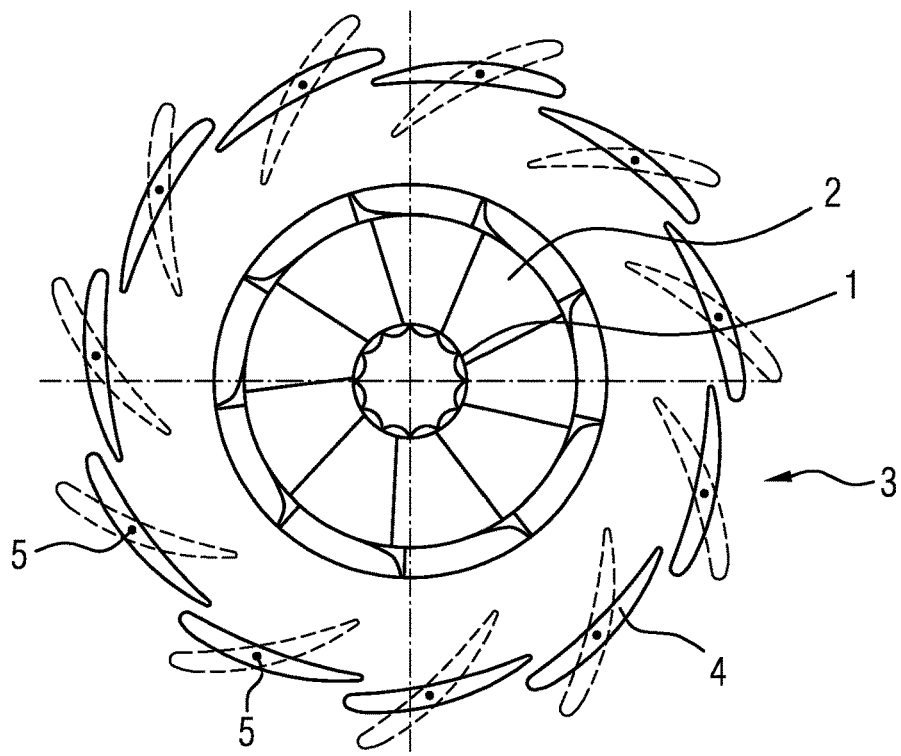
FIG. 1 a diagrammatic view of a turbine wheel with vane ring.

FIG. 1 depicts diagrammatically a turbine wheel 1 provided with guide vanes 2 of a turbine of an exhaust gas turbocharger for an internal combustion engine. The turbine wheel 1 is surrounded by a ring 3 of guide vanes 4 which are mounted rotatably so as to open and close an inflow channel, as shown with reference numeral 5. The individual guide vanes 4 are here mounted in a ring channel or annular inflow channel between a bearing housing and a turbine casing.

Figure 2:
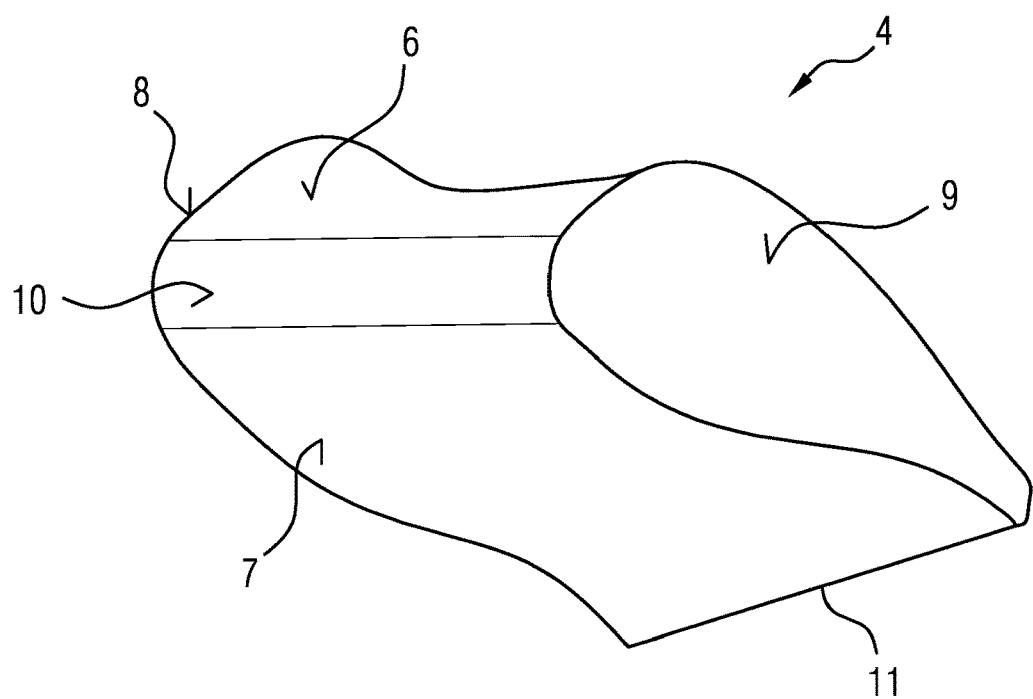
FIG. 2 a diagrammatic, spatial depiction of a guide vane of the vane ring from FIG. 1.

FIG. 2 shows a spatial depiction of one of the guide vanes 4 of the vane ring 3 from FIG. 1. The guide vane 4 has an outer face 6, an inner face 7, an end face 8 on the bearing housing side, an end face 9 on the turbine housing side, a leading edge 10 and a trailing edge 11.

The outer face 6 and the inner face 7 are each concave in design, where the ratio $\gamma_1+\gamma_2>0°$ applies. $\gamma_1$ here is the angle enclosed between the outer face 6 or inner face 7 at the transition to the end face 8 on the bearing housing side and a straight connection 15 with s=const between the transition of the end face 8 on the bearing housing side and the outer face 6 and inner face 7, and the transition of the end face 9 on the turbine casing side and the outer face 6 or inner face 7. $\gamma_2$ is the angle enclosed between the outer face or inner face at the transition to the end face on the turbine casing side and a straight connection with s=const between the transition of the end face on the bearing housing side and the outer face and inner face, and the transition of the end face on the turbine casing side and the outer face or inner face. $\gamma_1$ and $\gamma_2$ here have different values, so that in the region of the end face on the bearing housing side and the end face on the turbine casing side, different curvatures result for the outer face 6 and inner face 7.

Figure 3:
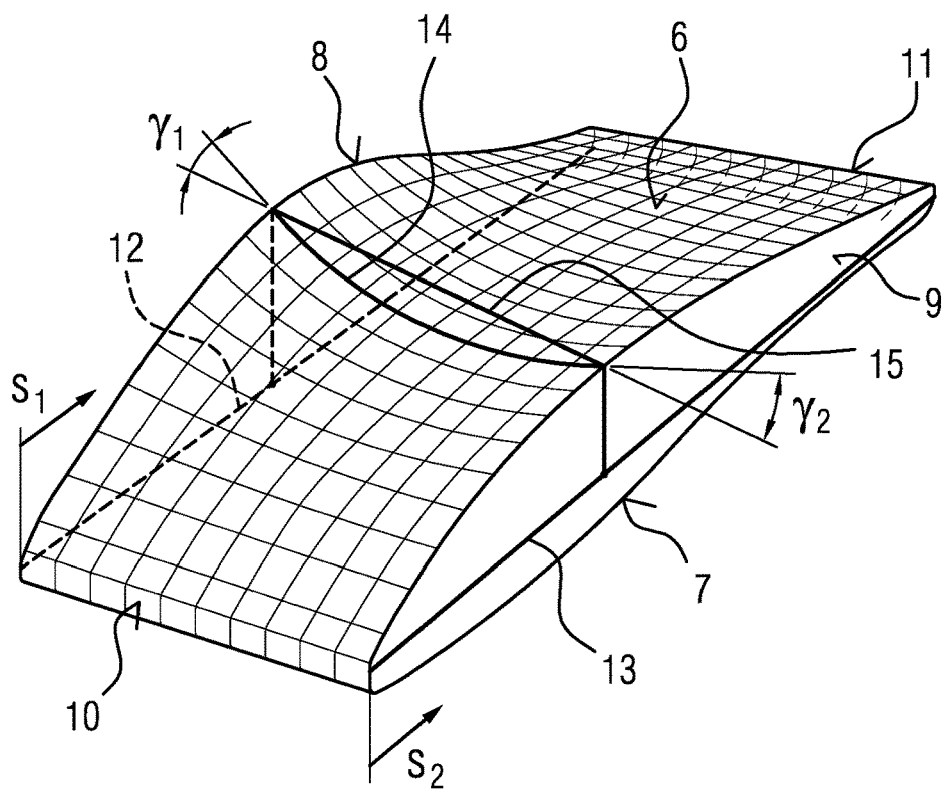
FIG. 3 a view of the guide vane from FIG. 2 with concave outer face.
Figure 4:
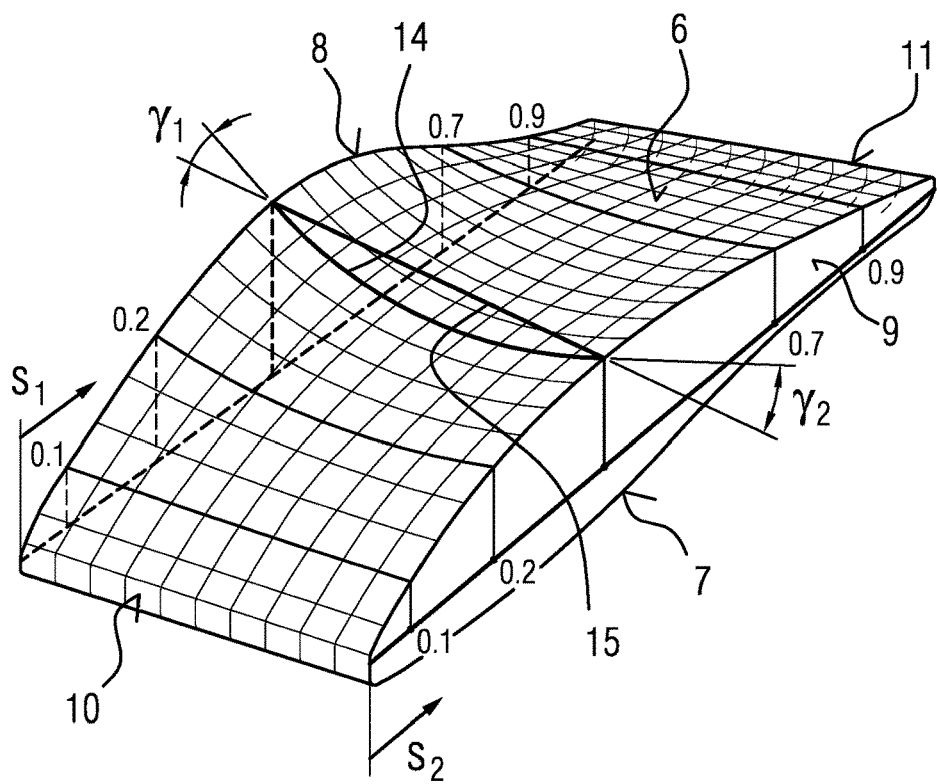
FIG. 4 a view corresponding to FIG. 3 depicting corresponding measurement points.

In FIGS. 3 and 4, the length of the two profile chords $s_1$ and $s_2$ or 12 and 13 are dimensionless with the unit length 1, so as to give the measurement points 0.1, 0.2, 0.7 and 0.9 shown in FIG. 4. In this example, the measurement point for the angles $\gamma_1$ and $\gamma_2$ lies between the value of s=0.2 and s=0.7.

The sum of the angles $\gamma_1$ (at the end face 8 on the bearing housing side) and $\gamma_2$ (at the end face 9 on the turbine casing side) is formed at the same relative position s along the profile chord s1 or s2. The length and orientation of these profile chords may differ.

In the example shown, the sum angle for the outer face 6 in a range from 0.2<s<0.7 corresponds to a value of $\gamma_1+\gamma_2>10°$. The maximum sum angle here should lie in a range of $30°<\gamma_1+\gamma_2<135°$.

The definition of the angles $\gamma_1$ and $\gamma_2$ applies accordingly for the inner face 7 of the guide vane 4. The inner face is also concave if the sum of the angles is $\gamma_1+\gamma_2>0°$. In the example shown, the sum angle for the inner face in a range from 0.5<s<0.9 corresponds to a value of $\gamma_1+\gamma_2>10°$.

The leading edge 10 and trailing edge 11 in the run rectilinearly. The leading edge and trailing edge need not however necessarily be arranged parallel to each other.

A number of implementations have been described. Nevertheless, it will be understood that various modifications may be made without departing from the spirit and scope of the disclosure. Accordingly, other implementations are within the scope of the following claims.

What is claimed is:

1. A guide vane for a variable turbine geometry with rotatably mounted guide vanes, wherein the guide vane comprises:
   an outer face;
   an inner face;
   an end face on a bearing housing side;
   an end face on a turbine casing side;
   a leading edge; and
   a trailing edge,
   wherein the guide vane has a cross-section which changes along a longitudinal axis,
   wherein the outer face is at least partially concave in design,
   wherein a ratio $\gamma_1+\gamma_2>0°$ applies, wherein:
      $\gamma_1$ is an angle enclosed between the outer face at the transition to the end face on the bearing housing side and a straight connection, the straight connection being between the transition of the end face on the bearing housing side facing the outer face and the transition of the end face on the turbine casing side facing the outer face;
      $\gamma_2$ is an angle enclosed between the outer face at the transition to the end face on the turbine casing side and the straight connection;
      wherein $\gamma_1$ and $\gamma_2$ are formed at the same relative position s on the respective profile chords $s_1$ and $s_2$ of the end faces on the bearing housing side and on the turbine casing side with a profile chord length with a dimensionless unit length of 1, and
      wherein $\gamma_1$ and $\gamma_2$ have different values.

2. The guide vane as claimed in claim 1, wherein the outer face has a three-dimensional curvature.

3. The guide vane as claimed in claim 1, wherein a length and/or orientation of the profile chords $s_1$ and $s_2$ of the end faces on the bearing housing side and turbine casing side are different.

4. The guide vane as claimed in claim 1, wherein the inner face of the guide vane is at least partially concave in design, wherein the ratio $\gamma_1+\gamma_2>0°$ applies to the inner face.

5. The guide vane as claimed in claim 4, wherein the inner face has a three-dimensional curvature.

6. The guide vane as claimed in claim 1, wherein the leading edge and the trailing edge are not parallel to each other.

7. The guide vane as claimed in claim 1, wherein the maximum sum angle $\gamma_1+\gamma_2$ lies in a range of $30°<\gamma_1+\gamma_2<135°$.

8. The guide vane as claimed in claim 1, wherein the leading and trailing edges run rectilinearly.

9. A turbine assembly with a variable turbine geometry, the turbine assembly comprising: a plurality of guide vanes arranged in a ring around a turbine wheel between a bearing housing and a turbine casing, each guide vane comprises:
   an outer face;
   an inner face;
   an end face on a bearing housing side;
   an end face on a turbine casing side;
   a leading edge; and
   a trailing edge,
   wherein the guide vane has a cross-section which changes along a longitudinal axis,
   wherein the outer face is at least partially concave in design,
   wherein a ratio $\gamma_1+\gamma_2>0°$ applies, wherein:
      $\gamma_1$ is an angle enclosed between the outer face at the transition to the end face on the bearing housing side and a straight connection, the straight connection being between the transition of the end face on the bearing housing side facing the outer face and the transition of the end face on the turbine casing side facing the outer face;

$\gamma_2$ is an angle enclosed between the outer face at the transition to the end face on the turbine casing side and the straight connection;

wherein $\gamma_1$ and $\gamma_2$ are formed at the same relative position son the respective profile chords $s_1$ and $s_2$ of the end faces on the bearing housing side and on the turbine casing side with a profile chord length with a dimensionless unit length of 1, and wherein $\gamma_1$ and $\gamma_2$ have different values.

10. The turbine assembly as claimed in claim 9, wherein the outer face has a three-dimensional curvature.

11. The turbine assembly as claimed in claim 9, wherein a length and/or orientation of the profile chords $s_1$ and $s_2$ of the end faces on the bearing housing side and turbine casing side are different.

12. The guide vane as claimed in claim 9, wherein the inner face of the guide vane is at least partially concave in design, wherein the ratio $\gamma_1+\gamma_2>0°$ applies to the inner face.

13. The turbine assembly as claimed in claim 12, wherein the inner face has a three-dimensional curvature.

14. The turbine assembly as claimed in claim 9, wherein the leading edge and the trailing edge are not parallel to each other.

15. The turbine assembly as claimed in claim 9, wherein the maximum sum angle $\gamma_1+\gamma_2$ lies in a range of $30°<\gamma_1+\gamma_2<135°$.

16. The turbine assembly as claimed in claim 9, wherein the leading and trailing edges run rectilinearly.

17. An exhaust gas turbocharger comprising the turbine assembly as claimed in claim 9.

* * * * *